(12) United States Patent
Morgan et al.

(10) Patent No.: US 8,776,935 B1
(45) Date of Patent: Jul. 15, 2014

(54) BI-DIRECTIONAL OVERRUNNING CLUTCH ASSEMBLY

(76) Inventors: George H. Morgan, Evansville, IN (US); James Edward Straw, Jr., Mount Vernon, IN (US)

(*) Notice: Subject to any disclaimer, the term of this patent is extended or adjusted under 35 U.S.C. 154(b) by 1093 days.

(21) Appl. No.: 12/592,375

(22) Filed: Nov. 24, 2009

Related U.S. Application Data

(60) Provisional application No. 61/200,199, filed on Nov. 25, 2008.

(51) Int. Cl.
*B60K 17/356* (2006.01)

(52) U.S. Cl.
CPC .................................. *B60K 17/356* (2013.01)
USPC .......................................... 180/242; 180/243

(58) Field of Classification Search
CPC ..... B60K 17/354; B60K 17/356; B60K 17/10
USPC ................. 180/242, 243, 165, 305, 307, 308; 903/960
See application file for complete search history.

(56) References Cited

U.S. PATENT DOCUMENTS

| | | | | | |
|---|---|---|---|---|---|
| 1,036,743 | A | * | 8/1912 | Sundh | 60/421 |
| 2,031,783 | A | * | 2/1936 | Linder | 192/45.006 |
| 2,965,204 | A | * | 12/1960 | Howard | 192/48.8 |
| 3,053,043 | A | * | 9/1962 | Knowler | 60/426 |
| 3,123,169 | A | * | 3/1964 | Young et al. | 180/247 |
| 3,194,369 | A | * | 7/1965 | Witte | 192/45.1 |
| 3,612,202 | A | * | 10/1971 | Moon et al. | 180/14.3 |
| 3,760,916 | A | * | 9/1973 | Hanks et al. | 192/69.5 |
| 3,780,820 | A | * | 12/1973 | Schwab et al. | 180/243 |
| 3,788,435 | A | * | 1/1974 | Prueter | 192/35 |
| 3,811,525 | A | * | 5/1974 | Stuart | 180/243 |
| 3,812,676 | A | * | 5/1974 | Smith | 60/431 |
| 3,819,233 | A | * | 6/1974 | Barnard et al. | 303/1 |
| 3,865,207 | A | * | 2/1975 | Schwab et al. | 180/253 |
| 3,874,470 | A | * | 4/1975 | Greene | 180/14.3 |
| 3,913,697 | A | * | 10/1975 | Greene | 180/14.3 |
| 3,918,546 | A | * | 11/1975 | Chichester et al. | 180/243 |
| 3,937,311 | A | * | 2/1976 | Gehrke | 192/45.017 |
| RE28,765 | E | * | 4/1976 | Smith | 399/247 |
| 3,981,374 | A | * | 9/1976 | Johns, Jr. | 180/14.3 |
| 4,098,379 | A | * | 7/1978 | Fogelberg et al. | 192/38 |
| 4,180,138 | A | * | 12/1979 | Shea | 180/65.25 |
| 4,212,557 | A | * | 7/1980 | Overbeek | 403/1 |
| 4,236,595 | A | * | 12/1980 | Beck et al. | 180/243 |
| 4,341,280 | A | * | 7/1982 | Dezelan | 180/243 |
| 4,396,087 | A | * | 8/1983 | Rock et al. | 180/243 |
| 4,480,502 | A | * | 11/1984 | Nembach | 180/243 |
| 4,518,053 | A | * | 5/1985 | Queveau | 180/14.2 |
| 4,528,871 | A | * | 7/1985 | Nembach | 74/733.1 |
| 5,098,352 | A | * | 3/1992 | Montanaro et al. | 475/86 |
| 5,549,187 | A | * | 8/1996 | Kofler | 192/35 |
| 5,560,203 | A | * | 10/1996 | Pollman | 60/327 |
| 5,819,870 | A | * | 10/1998 | Braun | 180/305 |
| 5,848,664 | A | * | 12/1998 | Kaspar | 180/308 |

(Continued)

*Primary Examiner* — Hau Phan
*Assistant Examiner* — Jacob Meyer
(74) *Attorney, Agent, or Firm* — Gary K. Price; George H. Morgan

(57) ABSTRACT

A drive arrangement comprising a power source driving a First shaft, a second shaft, and at least one double overrunning clutches mechanically connecting the first shaft to the second shaft.

The double overrunning clutch is stacked in axial alignment around said first shaft and engage an interior surface of the second shaft such that torque from the first shaft can be selectively transmitted to the second shaft.

3 Claims, 3 Drawing Sheets

©2008 JIM STRAW STUDIOS

(56) References Cited

U.S. PATENT DOCUMENTS

| | | | |
|---|---|---|---|
| 5,915,514 A * | 6/1999 | Nojiri et al. | 192/38 |
| 5,927,455 A * | 7/1999 | Baker et al. | 192/36 |
| 5,996,701 A * | 12/1999 | Fukasawa et al. | 172/2 |
| 6,033,334 A * | 3/2000 | Showalter | 475/206 |
| 6,123,183 A * | 9/2000 | Ito et al. | 192/220 |
| 6,390,054 B1 * | 5/2002 | Yang | 123/295 |
| 6,547,025 B1 * | 4/2003 | Gassmann et al. | 180/248 |
| 6,550,595 B2 * | 4/2003 | Kuczera | 192/48.3 |
| 6,557,677 B2 * | 5/2003 | Peura | 192/3.56 |
| 7,114,585 B2 * | 10/2006 | Man et al. | 180/65.21 |
| 7,214,156 B2 * | 5/2007 | Oliver | 475/8 |
| 7,246,670 B2 * | 7/2007 | Hayashi et al. | 180/6.2 |
| 7,276,016 B2 * | 10/2007 | Ishii et al. | 477/115 |
| 7,726,425 B2 * | 6/2010 | Ishii et al. | 180/53.4 |
| 8,316,774 B1 * | 11/2012 | Coots | 105/72.2 |
| 2002/0117860 A1 * | 8/2002 | Man et al. | 290/46 |
| 2002/0173401 A1 * | 11/2002 | Bowen | 475/269 |
| 2003/0162631 A1 * | 8/2003 | Williams | 477/5 |
| 2003/0192762 A1 * | 10/2003 | Peura | 192/36 |
| 2004/0082433 A1 * | 4/2004 | Williams | 477/5 |
| 2004/0173393 A1 * | 9/2004 | Man et al. | 180/65.2 |
| 2005/0183416 A1 * | 8/2005 | Hayashi et al. | 60/445 |
| 2005/0282682 A1 * | 12/2005 | Ishii et al. | 477/107 |
| 2006/0157291 A1 * | 7/2006 | Puiu et al. | 180/247 |
| 2006/0213742 A1 * | 9/2006 | Irikura et al. | 192/44 |
| 2007/0163854 A1 * | 7/2007 | Irikura et al. | 192/50 |
| 2008/0153649 A1 * | 6/2008 | Puiu et al. | 475/84 |

* cited by examiner

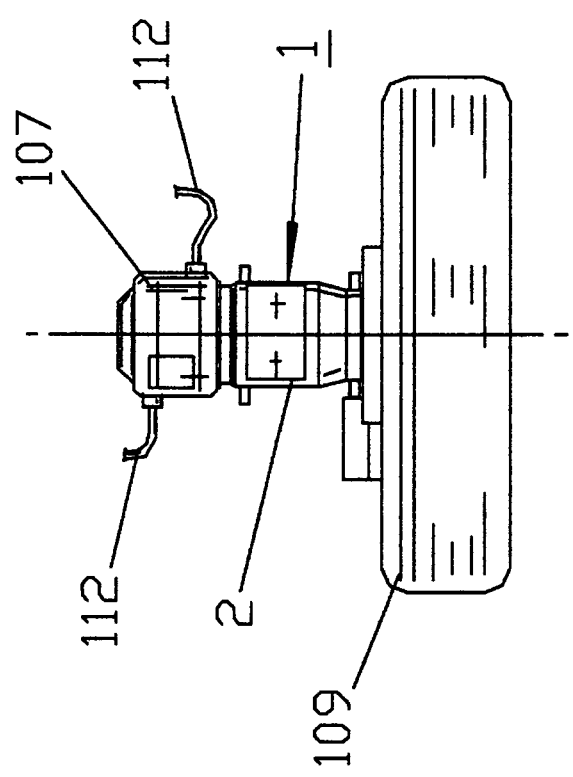

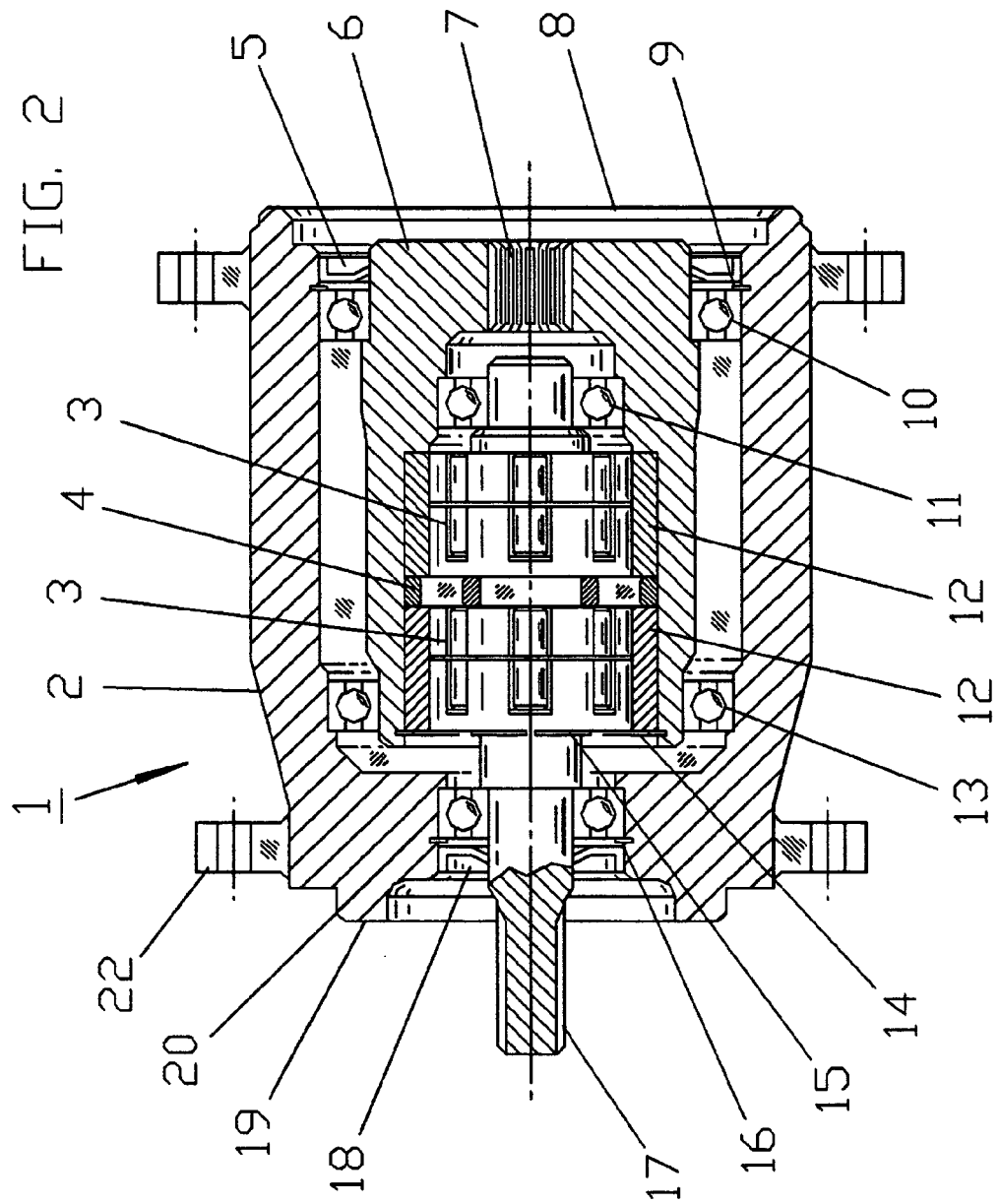

BI-DIRECTIONAL OVERRUNNING CLUTCH ASSEMBLY

CROSS REFERENCES TO RELATED APPLICATIONS

Provisional Application for Patent No. 61/200,199 of Nov. 25, 2008 with the same title "Bi-Directional Overrunning Clutch Assembly" which is hereby incorporated by reference. Applicant claims priority pursuant to 35 U.S.C. Par. 119 (e) (i).

Co-pending application Ser. No. 12/583,260 for Hydraulic Hybrid Drive Apparatus filed May 16, 2009.

A portion of the disclosure for this patent document contains material to which a claim for copyright is made. The copyright owner has no objection to the facsimile reproduction of by anyone of the patent document or the patent disclosure, as it appears in the Patent and Trademark Office patent file or records, but reserves all other copyrights whatsoever.

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a bi-directional overrunning clutch assembly such as would be used for purposes of power transmission, especially in fluid power driven machinery and equipment.

2. Background Information

Hydraulic systems are popular in applications involving hazardous, dirty, and nasty environments, such as coal mines, quarries, food processing plants, and construction sites.

Much effort has been expended in trying to increase the efficiency and performance ranges of hydraulic drives. The experience of co-inventor, George H. Morgan, over the past 35 years, has been that simple mechanisms in convenient packages for bolting between hydraulic components such as hydraulic pumps and motors, greatly simplify and extend the range of applications for hydraulic driven machinery and equipment.

This is especially true for brakes, clutches, and brake/clutch combinations.

Past industrial surveys have indicated that the field of brakes and clutches is most frustrating for machinery designers. They can't find what they want and application information is inadequate in many instances. The problem is especially acute for short run equipment and machinery manufacturers.

As an example, the development of the AUSCO™ failsafe brake and clutch line featured brakes, brakes with one way clutches, and clutches in convenient configurations that bolted between planetary gear boxes and hydraulic motors, most of which had mounting configurations to the SAE J744 pump mounting standards. With standard convenient configurations, ready to bolt into position, with large factors of safety, the simple approach was very well received by equipment and machinery designers. By having standard, off the shelf configurations, matching what was already out there, marketed through fluid power distributors as an afterthought with the hydraulic motors and pumps, produced in respectable volumes, the approach swept the industry in the 1970s and 1980s. The approach solved a real problem in the application of brakes and clutches for the short line equipment builders. The volume demand permitted economics of scales that led to the acceptance by major manufacturers beyond short run equipment builders. While there is a double overrunning clutch available from HILLIARD™, it is not in a package convenient to short run equipment manufacturers.

SUMMARY OF THE INVENTION

The present invention in the preferred embodiment is a clutch assembly comprising a housing, at least one self engaging bi-directional overrunning clutch, a power input shaft, a power output shaft, shaft supporting bearings, seals, and retaining rings.

The housing, in the preferred embodiment of the present invention, comprises a forward male pilot and a rear female pilot, and mounting flanges to simplify installation. The at least one bi-directional over-running clutch fits between the power input and the power output shafts.

BRIEF DESCRIPTION OF THE DRAWINGS

FIGS. 1 and 1A illustrate potential applications of the preferred embodiment of the present invention, a bi-directional overrunning clutch assembly.

FIG. 2 illustrates the preferred embodiment of the present invention is a configuration facilitating installation.

DESCRIPTION OF THE PREFERRED EMBODIMENTS

Figure 1:
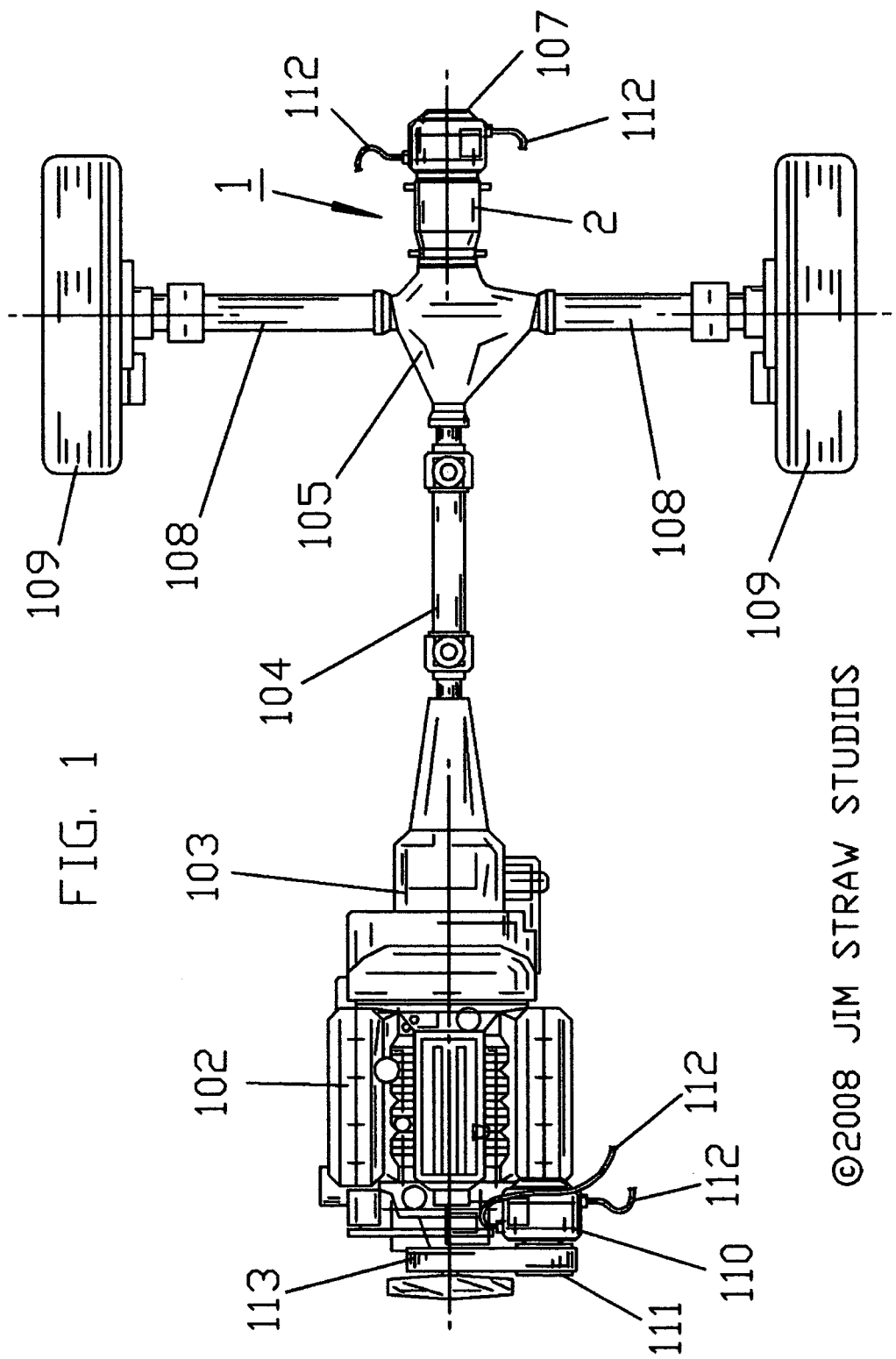

Referring to FIG. 2, the preferred embodiment of the present invention, a self engaging bi-directional overrunning clutch assembly 1 comprises a housing 2, at least one self engaging bi-directional overrunning clutch 3, a power input shaft 6, a power output shaft 17, shaft supporting bearings 10, 11, 13, 14, and 20, seals 5 and 18, snap rings 9, 14, 15, 16, and a spacer 4.

The housing comprises mounting flanges 22 and 23.

In operation, When an input torque is imparted to either of said shafts 6 or 17, the at least one bi-directional overrunning clutch 3 engages the other of said shafts 6 or 17, imparting the torque from the either of said shafts 6 or 17 to the other of said shafts 6 or 17, to drive a load such as a wheel 109 (Ref. FIG. 1A) or a wheel 109 through a differential 105 (Ref. FIG. 1).

To simplify the explanation, say the said shaft 6 is driving the said shaft 17 through said clutch assembly 1, which is driving the wheel 109 shown in FIG. 1A. If the wheel 109 overruns the driving shaft 6, the said shaft 17 overrun the said shaft 6, because of the at least one self engaging bi-directional overrunning clutch 3. In the arrangement shown in FIG. 2 there are two clutches 3 mechanically acting in parallel, that is to say each clutch 3 carries half the load and in overrunning both clutches overrun.

This provides significant advantage over simply making a bigger clutch as a bigger clutch would take up more space causing the shaft 6 to be larger in diameter which in turn would cause the housing 2 to be larger in diameter which is very undesirable in many applications. Using the concept it would be possible to arrange 3 or 4 clutches in parallel to carry higher loads.

In FIG. 1, a hydraulic motor 107 is driving through said clutch assembly 1 into the a differential 105, to turn the wheels 109, while a transmission 103 is in neutral. When an operator of a vehicle drive with an internal combustion engine 102 serving as the power source, the transmission 103, a driveline 104, the differential 105, axles 108, and wheels 109 wants to go faster, such as after start up with the hydraulic motor 107, the operator of the vehicle drive can engage the transmission 103 and drive the driveline 104 which drives through the differential 105 which drives the axles 108 which drive the wheels 109 from the engine 102, through the transmission 103, through the driveline 104, through the differential 105, through the axles 108, overrunning the hydraulic motor 107 because of the self engaging bi-directional overrunning clutches 3 within the clutch assembly 1. This is a much simpler approach than using a multiple disc or jaw clutch or cone clutch with all the problems of engagement and disengagement.

In FIG. 1A, in a multiple wheel vehicle, driving the vehicle faster with other wheels is greatly simplified with the self engaging bi-directional overrunning clutch assembly 1 ((Ref. FIG. 1). This facilitates multiple speed arrangements for vehicle designers, such as, but not restricted to construction equipment, where sometimes extra torque is required in a low speed mode.

In the preferred embodiment of the present invention, the at least one self engaging bi-directional overrunning clutch 3 is a Hilliard™ self engaging bi-directional overrunning clutch such as is known in the snowmobile and ATV trade.

As HILLIARD™ has limited sizes available, having said shafts 6 and 17 properly sized to allow multiple said clutches 3 to be inserted between said shafts 6 and 17, the torque rating of said clutch assembly 1 can be increased, with minimal effect on configuration profile. FIG. 1 illustrates a hydraulic pump 110, with hydraulic lines 112, which are in fluid communication with a hydraulic motor 107 attached to said clutch assembly 1 which is connected to a differential 105 which is connected to a driveshaft 104 and axles 10, said axles 118 driving wheels 109, said driveshaft 104 attached to a transmission 103, attached to an engine 102. The hydraulic pump 110 comprises a solenoid actuated clutch engageable pulley 111 driven by a belt drive off the engine 102.

The differential 105, as shown in FIG. 1, has two inputs, one from the drive line 104 and one from the hydraulic motor 107 through the clutch assembly 1. This permits two inline torque inputs into the differential 105 which is very simple design approach as compared to existing cumbersome approaches. Extra pieces and extra connections are very unacceptable in the automotive design world.

For hydraulic driving of the wheels at low speed, the transmission 103 is in neutral, the solenoid actuated clutch engageable pulley is engaged, engaging the pump 110 which pumps oil to the motor 107 to drive through said clutch assembly 1 with a mounting housing 2, engaging said at least one clutch 3 (Ref. FIG. 2), which drives through the differential 105, which drives the axles 108, which drives the wheels 109.

When a higher speed is desired, the transmission 103 is engaged, the hydraulic pump 110 disengaged, and the drive shaft 104 drives through the differential 105 at a higher speed than the hydraulic motor 107, and the power output shaft 107 FIG. 2) overruns the power input shaft 6, thanks to said at least one clutch 3. This greatly simplifies clutch engaging arrangements as compared to cone clutches, multiple disc clutches, or other types of clutches that require force inputs for actuation or release.

In the preferred embodiment the differential 105 is of the type with a ring gear and two pinion gears which is common to the trade.

In the preferred embodiment of the present invention, the pump clutch 111 is a solenoid operated belt and pulley driven electric clutch such as is used in automotive air conditioning systems. Scherer Fluid Power, of Troy, Mich. applied such a clutch to a hydraulic pump some 25 or 30 years ago. The pump clutch 111 is shown with the pump 110 with hydraulic lines 112 which are in fluid communication with the hydraulic motor 107.

In the preferred embodiment of the present invention, the hydraulic motor 107 is a ROLLER STATOR™ HB series hydraulic motor manufactured by White Hydraulics of Hopkinsville, Ky.

In the preferred embodiment of the present invention, the clutch 3 is a self engaging bi-directional overrunning clutch such as is manufactured by the motion control division of the Hilliard Corporation of Elmira, N.Y. The clutch 3 as is manufactured by the Hilliard Corporation comprises modified SPRAG™ type elements that not only engage upon power input, from either direction but permits a driven load to overrun the power input.

In operation, when smooth operation of a vehicle drive (not shown) at low speeds is desired, the engine 102 power is diverted from the drive line 104 by having the transmission 103 in neutral, and using the hydraulic pump 110, through the belt drive 113 and the pump clutch 111. Hydraulic fluid is pumped from the hydraulic pump 110 to drive the hydraulic motor 107, mounted on the clutch assembly 1 which is mounted on the differential 109, said hydraulic motor 107 driving the axles 108 through the clutch assembly 1 which is engaged by the activation of the internal modified SPRAG type elements upon receiving an input motion from the hydraulic motor 107. The axles 108 drive the wheels 109. The engine 102 is operated in a speed range where the engine 102 operation is smooth, and efficient, while the speed of the driven wheels 109 of the vehicle (not shown) can be controlled by various means such as a variable speed axial piston pump 110, a variable speed hydraulic motor 107, or, with proper sizing, a fixed displacement pump 110 and a fixed displacement hydraulic motor 107, such as the previously mentioned ROLLER STATOR HB hydraulic motor 107, and a variable engine 102 speed.

Danfoss Sauer, with plants in Denmark, Germany, and the United States, manufactures a range of axial piston hydraulic pumps with electro/hydraulic controls that would be quite suitable for this application.

When a given speed is reached where said engine 102 can operate the vehicle in a conventional manner, the transmission 103 is engaged, the hydraulic pump 110 is declutched. The hydraulic motor 107 is not engaged because of the overrunning feature of said at least one said clutch 3 of said clutch assembly 1.

In the preferred embodiment of the present invention, said engine 102 is a gasoline engine which is using fuel compression ignition technology from diesel engines to improve engine performance. Currently, this is known as homogeneous charge compression ignition technology.

By setting said engine 102 in the conventional manner to drive a vehicle at optimum transit speeds for fuel economy, and using the hydraulic drive arrangements at slow speeds, such as initial start up speeds to reach transit speeds, the limitations inherent in current HCCI engines are considerably alleviated.

Combining a hydraulic drive apparatus with a homogeneous charge compression ignition technology prime mover engine 102 alleviates the problem of rough operation of a vehicle with a homogeneous charge compression ignition technology prime mover engine 102 operating at low speeds.

An alternate preferred embodiment is the conversion of front wheel drive vehicles to four wheel drive vehicles by using the engine 102 to drive the hydraulic pump 110 to drive two hydraulic motors 107, each of said hydraulic motors 107 driving through a respective clutch assembly 1 to drive it's respective rear wheel 109. This is a solution for converting front wheel drive vehicles to four wheel drives, a problem that has perplexed vehicle designers to the present day (Ref. FIG. 1A). The self engaging bi-direction overrunning clutch 3 permits forward and reverse operation, without external means of engagement.

A second alternative embodiment would be an auxiliary vehicle drive means comprising the engine 102 driving the pump 110 supplying fluid to each of two hydraulic motors 107 through its respective clutch assembly 1 into each of the two front wheels 109 of a rear wheels 109 driven vehicle-or into the rear wheels 109 of a front wheel 109 driven vehicle. This is a means of converting two rear wheel driven vehicles such as pickup trucks used as service auxiliary vehicles in surface mining operations to four wheel drives, providing the higher torque required for driving up mine access slopes than is standard with conventional four wheel drive vehicles. Ref FIG. 1A illustrating a hydraulic motor 107 into said clutch assembly 1 into the wheel 109.

As an example, with a differential 105 with a 3.5/1 input/output ratio, and a 210 foot pound Hilliard self engaging bi-directional double overrunning clutch 3 tied into the drive line 4 through the differential 105, with a 6.5 cubic inch White ROLLER STATOR™ HB series motor 107, with the hydraulic pump 110 producing 4.4 gallons per minute (gpm) at 3,000 psi, with a wheel 9 rolling radius of 13 inches, the tractive effort of each of the wheels 9 at 3,000 psi would be approximately 680 pounds. The 4.5 gpm would result in approximately 10 miles per hour vehicle speed. This figure assumes an 85% mechanical efficiency with a 90% volumetric efficiency of the ROLLER STATOR hydraulic motor 107 serving as the hydraulic motor 107, and a 90% volumetric efficiency for the hydraulic pump 110. For a hydraulic pump or motor, the volumetric efficiency represents the usable output of fluid compared to the fluid input. The difference is the internal leakage required for lubrication of internal parts of the hydraulic pump or motor. The internal leakage is a function of pressure differential across the hydraulic pump or motor.

In co-applicant Morgan's experience, spanning some forty years in the field of hydraulics comprising product design, circuit design, and sales and marketing experience, the combination of an axial piston pump 110 and a White Hydraulics model HB motor 109, in vehicle drives, precludes the requirement of a hydraulic oil cooler.

Using multiple said clutches 3, multiples of the above calculated torques can be obtained with off the shelf clutches 3, thereby avoiding tooling costs for special configuration, such as larger diameters.

The White Hydraulics ROLLER STATOR™ HB series White motor has very smooth operation at unusually low revolutions. Applicant witnessed a HB series motor (in the 24 cubic inch displacement, as memory serves, some 20 years ago) tested at one sixth of a revolution per minute, with no visible clocking or output shaft ripple. It was used on hydraulic wheel chair drives because of this characteristic. In the preferred embodiment of this invention, the operating speed is from zero to approximately 132 revolutions per minute. With proper fluid selection the speed range is approximately triple that. However, the intent is to operate a vehicle with hydraulics until the vehicle speed is such the said engine 2 can smoothly operate the vehicle.

Although the description above contains many specificities, these should not be construed as limiting the scope of the invention but as merely providing illustrations of some of the presently preferred embodiments of this invention.

For example, the HILLIARD double overrunning clutch 3 is the preferred embodiment, as is the pulley driven electric actuated clutch. Weight is an important consideration in vehicle design. However, as obvious to anyone skilled in the art, there are almost countless varieties of clutches that can be made to work, albeit perhaps with weight and complexity disadvantages.

Also, there are other ways to tie in the said clutch assembly 1 and the hydraulic motor 107 into the driveline 104. Adding a power take off gearing arrangement would be an off highway type solution. However, this involves added weight, additional gears with resultant slight decrease in operating efficiencies, and possible loss of smoothest operation potential.

Also, the hydraulic pump 110 and pump clutch 111 can be Connected to the engine in a variety of ways, by the automobile manufacture's engineers, such as, but not restricted to, off the crankshaft at the front of the engine, off an accessory drive gearing arrangement, or a chain accessory drive. Space limitations, weight, reliability, and cost are among the factors involved.

In front wheel drives, the drive shaft 104 and the differential 105 functions, as well as the transmission 103 functions, are incorporated adjacent, if not within, the engine 102. So, the said clutch assembly 1 and the motor 107 could be tied into the differential 105 in the engine 102/transmission 103 region of the vehicle, as opposed to the rear of the vehicle as indicated in FIG. 1.

While FIG. 1 illustrate a differential 105 applied as a rear end differential 105, the differential 105 could be near the front of a front wheel drive vehicle, incorporated within a different type housing as opposed to what is represented in FIG. 1.

While the input power shaft 6 is shown as an internally splined shaft, and the output power shaft 1 is shown as an externally splined shaft, as obvious to anyone skilled in the art, either of the shafts 6 or 17 could be internally or externally splined.

The term fluid is intended to cover any fluid suitable for serving its intended purpose in the preferred embodiment of the invention described. There are many different types of fluids currently used or being developed for hydraulic drives, such as, but not restricted to, hydraulic oils, engine oils, synthetic oils, vegetable base oils, even water with and without additives.

For enablement purposes, MOBIL 1 synthetic oil with a 10W30 viscosity should serve well. The temperature rating is in the order of 400 degrees F. as opposed to most hydraulic oils designed for 120 degree F. system temperatures. This oil worked well for an application of a hydraulic drives designed by co-applicant Morgan in a region where the ambient temperatures reach 165 degrees F. in the summer.

It will be obvious to those skilled in the art that modifications may be made to the embodiments described above without departing from the scope of the present invention. Thus the scope of the invention should be determined by the appended claims in the formal application and their legal equivalents, rather than by the examples given.

We claim:
1. A vehicle drive comprising:
an internal combustion engine, serving as the power source driving a first shaft,
a hydraulic motor,
a hydraulic pump,
a second shaft drivable by the hydraulic motor, at least one self engaging bi-directional overrunning clutch mechanically connecting the first shaft to the second shaft, wherein the self engaging bi-directional overrunning clutch is mounted around said first shaft and engages said second shaft such that torque from the first shaft can be transmitted to said second shaft, a transmission, a drive line, a rear end differential with two inputs, axles, wheels, and wherein, with the transmission in neutral, the engine drives the hydraulic pump which supplies fluid to the hydraulic motor, which drives through the self engaging bi-directional overrunning clutch into a first input of the differential to drive the axles which drive the wheels, wherein, when a higher speed is desired, the transmission is shifted from neutral, so as to drive the drive line, said drive line connected to a second input of the differential, said drive line driving the differential which drives the axles which drive the wheels, wherein the drive line drives the differential faster than the hydraulic motor, overrunning the hydraulic motor because of the self engaging bi-directional overrunning clutch and driving the axles which drive the wheels.

2. The drive of claim 1 wherein the first shaft is mounted internally
in the second shaft, and wherein the self engaging bi-directional overrunning clutch is mounted internally within the second shaft.

3. The drive of claim 1 wherein said hydraulic motor is powered by the internal combustion engine, wherein the internal combustion engine drives the pump to selectively supply hydraulic fluid to power said hydraulic motor.

\* \* \* \* \*